March 31, 1970 H. BLASZKOWSKI Re. 26,842

RETRACTABLE SEAT BELT CONSTRUCTION

Original Filed April 14, 1964

INVENTOR.
HENRY BLASZKOWSKI.
BY Allen M. Kraus
ATTORNEY

United States Patent Office

Re. 26,842
Reissued Mar. 31, 1970

26,842
RETRACTABLE SEAT BELT CONSTRUCTION

Henry Blaszkowski, 22315 Maplewood Drive,
Southfield, Mich. 48075

Original No. 3,243,232, dated Mar. 29, 1966, Ser. No. 359,575, Apr. 14, 1964, which is a continuation-in-part of applications Ser. No. 338,061, Jan. 16, 1964, and Ser. No. 342,103, Feb. 3, 1964. Application for reissue Mar. 27, 1968, Ser. No. 742,102
Int. Cl. B60r *21/10;* A62b *31/00*
U.S. Cl. 297—388 12 Claims

Matter enclosed in heavy brackets [ ] appears in the original patent but forms no part of this reissue specification; matter printed in italics indicates the additions made by reissue.

*ABSTRACT OF THE DISCLOSURE*

*A self-retracting seat belt having a self-rolling section located along the length of the belt adapted to roll simultaneously from both ends into two spiral rolls when released.*

This application is a continuation-in-part of my copending applications, Ser. No. 338,061, filed Jan. 16, 1964, now Patent 3,307,873 and Ser. No. 342,103, filed Feb. 3, 1964, now abandoned.

This invention relates to improvements in retractable automobile or airplane seat belts and more particularly relates to improvements in the construction of seat belts which are automatically self-rolling when not in position about the body of the user.

In the aforementioned applications, I have disclosed a self-rolling seat belt wherein the belt straps are fabricated in such a manner as to be self-rolling between their ends anchored respectively to the vehicle and the mechanical locking mechanism or clips at the forward ends of the straps. Each strap is automatically rolled into a spiral form when the user releases his belt from its extended position about his waist.

I have previously disclosed a number of preferred constructions for the belt. For example, I have suggested adhering a prestressed layer of resilient material to a portion of each strap on a conventional seat belt. When the strap is released, the prestressed layer rolls upon itself, pulling the strap with it to form a laminated spiral roll.

A problem encountered in self-rolling structures of this kind involves controlling which end of the self-rolling section will first begin to roll upon itself. Since variations in the tension of the prestressed layer will affect the tendency of the self-rolling section to begin to roll from one end, it was suggested in the aforementioned applications that the prestressed layer may be applied to the relaxed strap with the tension varying uniformly from one end of the layer to the other. This would cause the strap to always roll from the same end. However, adapting the fabricating equipment to produce such a variation in the tension of the prestressed layer further complicates the construction of the belt and appreciably increases its cost.

In addition it has been found that, where a single spiral roll of this kind is employed, it is frequently difficult to cause the strap to roll up upon itself in a neat uniform spiral, regardless of the orientation of the strap and buckle when it is released. If the user has twisted the strap, and then releases it, the belt will frequently roll up upon itself in a disorderly fashion, with a detrimental effect upon the appearance of the rolled belt. This is due to the length of the strap which must be rolled; the longer the distance through which the belt must roll, the greater is the tendency for twisting or skewing to occur. In order to prevent such skewed or non-uniform rolling of the belt, it was considered necessary either to use heavier layers of fabric and prestressed material than would ordinarily be required, or to employ some type of mechanical guide.

It is, therefore the object of the present invention to provide a self-rolling seat belt of this kind, which will roll smoothly and uniformly under all conditions of the belt.

It is a further object of the present invention to provide a belt of this kind, which may be constructed without abnormally thick layers of fabric and resilient material, and without any type of mechanical guide or other external device.

A further object of the present invention is to provide a belt of this kind in which the retracted belt presents a neat aesthetically pleasing appearance, and assumes a compact and convenient shape.

Still another object of the present invention is to provide a self-rolling strap of this kind which is of simple construction, is relatively inexpensive to fabricate, and lasts substantially as long as the fabric material in the belt.

In a preferred embodiment of the invention which will be subsequently described in greater detail, this is accomplished by providing a uniform tension in the prestressed resilient layer applied to the fabric. The self-rolling section of the belt is disposed approximately midway along the length of the portion of the belt to be retracted. When the strap is released, the self-rolling portion is permitted to roll from both ends simultaneously, thereby creating a pair of adjacent identical spiraled rolls. The resulting rolled strap will retract in the same fashion as the retractable belt described in my prior aforementioned applications. However, the present belt will avoid the requirement of supplementary equipment adapted to provide a variation in tension along the length of the prestressed resilient layer. The dual rolls are far more resistant to non-uniform rolling of the belt as it retracts than is the single spiral roll, since the distance through which each roll moves is half of that required of a single roll. As a result, the same materials may be used as were suggested in the aforementioned applications with respect to a single spiral roll, but with a neater and more convenient result.

The above described dual-roll retractable strap may be employed in a belt regardless of the technique employed to produce the self-rolling feature. For example, a seat belt wherein a spiraled leaf spring is employed to produce the rolling effect may be rolled up into a pair of spiraled rolls in the same manner as described above. Any of the self-rolling belt constructions disclosed in my aforementioned applications may employ this double-roll feature. The same double-roll principle can also be employed in various types of protective coverings, such as those suggested in United States Patent No. 2,826,523, wherein the covering is retracted into a rolled position.

This principle is similarly adaptable to the end of a seat belt strap extending beyond the buckle; in my application, Ser. No. 342,103, I have disclosed the manner in which this end of the strap may be constructed to be self-rolling. The self-rolling section can be confined to the mid-portion or the end of this extra segment of strap, and evenly stressed so as to roll up into two spiral rolls.

Other advantages, objects and applications of the present invention will be more readily apparent from the following detailed description of a preferred embodiment thereof. The description makes reference to the drawing in which.

Figure 1:
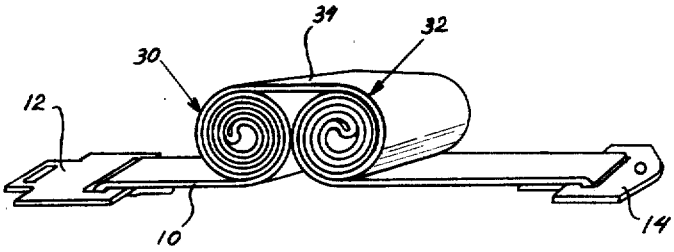
FIGURE 1 is a perspective view of a seat belt strap constructed in accordance with a preferred embodiment of the present invention.
Figure 2:
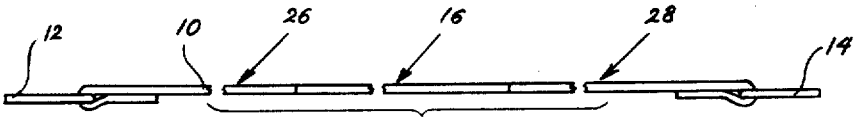
FIGURE 2 is a broken side view of the strap of FIGURE 1 in its fully extended position.

Referring to the drawings in detail, FIGURES 1 and 2 show a belt strap 10 constructed of conventional fabric material and having a conventional seat belt buckle 12 at one end thereof. The opposite end of the strap 10 includes a conventional fastener 14 adapted to be connected to the interior frame of an automobile below the seat.

Figure 3:
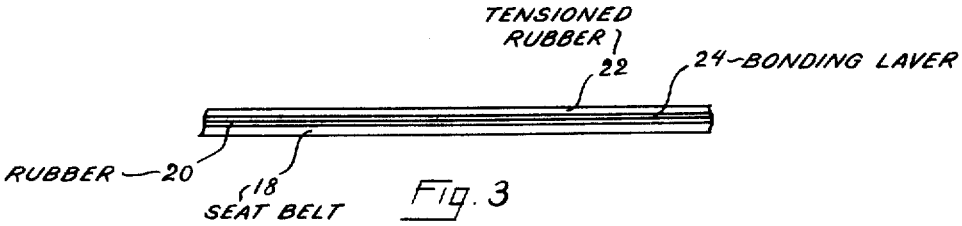
FIGURE 3 is an enlarged side view of the self-rolling portion of the belt of FIGURES 1 and 2.

As shown in FIGURE 2, a self-rolling section 16 is located approximately midway along the length of the strap 10. FIGURE 3 shows a suggested construction of the self-rolling section 16. In this construction, a layer of conventional seat belt fabric 18 is rubberized along one face as indicated at 20. A panel of rubber 22 or other suitable material is placed in tension and bonded in this condition to the rubberized fabric 18 by means of a suitable adhesive 24.

As a result of this construction, when the belt is released, each end of the self-rolling section 16 will begin to curl or roll towards its center. As the ends of the self-rolling portion roll inwardly in this manner, the two nonself-rolling portions 26 and 28 situated at opposite ends of the self-rolling portion 16 will be pulled with the ends of the self-rolling portion into the spiral configuration as shown in FIGURE 1. Since the tension in the rubber layer 22 is uniform throughout, the two ends of the self-rolling portion 16 will roll with the same tension and will pull an equal length of the nonself-rolling sections 26 and 28 into their respective spiral rolls 30 and 32. The two rolls will therefore be of substantially the same size, as indicated in FIGURE 1, and will be joined by means of a short planar section 34 at the center of the self-rolling portion 16.

If desired, the self-rollng section 16 could be located closer to the buckle 12 or to the fastener 14. In such a case, the spiral roll 30 or 32 having the largest nonself-rolling section 26 or 28 will form the largest roll.

The purpose of the rubberizing layer 20 is primarily to prevent compression of the fabric 18 under the forces exerted by the prestressed layer 22, and secondarily to provide a suitable surface for bonding to the prestressed layer. Under proper conditions of the fabric and the adhesive, the prestressed layer may be bonded directly to the fabric; in such a case, it has been found that rubberizing the face of the fabric opposite to that contacting the prestressed layer produces substantially the same self-rolling effect.

The same results may be obtained by employing a suitably-woven fabric material for the belt strap having sufficient strength to resist compression under the force of the prestressed layer. When such structural resistance is obtained by the fabric material weave, rubberizing of the fabric may be eliminated completely.

Figure 4:
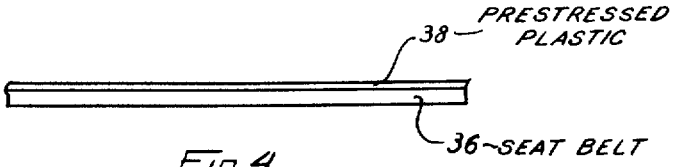
FIGURE 4 is a view similar to FIGURE 3 showing a second construction of the self-rolling portion.

Various other constructions of the self-rolling portion 16 are possible. In FIGURE 4, the fabric material 36 is impregnated or coated with a layer of plastic material 38 such as Mylar, rolled into the double-spiral position, and cured in this position. The result will be to form a self-retracting belt with the two rolls 30 and 32 as described above.

In another preferred construction of the self-rolling section 16, the fabric material 18 is coated with a rubberizing compound, rolled into the dual-roll position of FIGURE 1, and the rubber material cured at this stage. This produces tension in both rubberizing layer 20 and rubber layer 22 when the belt is pulled into its flat extended position. As a result, greater tension is created in the belt than would be the case if the fabric 18 was rubberized and cured in its flat position. Consequently, the prestressed rubber layer 22 need not be stretched as much as is required when the rubberizing layer 20 is cured in its flat position. Various modifications of this method of constructing the self-rolling portion 16 might also be employed. For example the rubberizing layer 20 might be cured in its flat position while the outer layer 22 is cured in its spiral position, or vice-versa.

The dual-roll principle may also be employed with the various types of protective coverings such as those suggested in United States Patent No. 2,826,523. In such protective coverings, the self-rolling portion may be provided midway along the length of the covering, so as to roll the nonself-rolling sections of the covering into a dual-spiral configuration similar to that shown in FIGURE 1. Various modifications of this construction of the protective coverings will be obvious in view of the particular need for which the covering is provided.

The principle of a dual-roll retractor may be applied in a variety of other applications wherein a flexible elongated member must be retracted from an extended position. The strap may be of any length, and where necessary as many dual-roll sections may be employed as are necessary to sufficiently retract the strap.

Having thus described my invention, I claim:

[1. In combination, a length a seat belting, a fastener member connected to one end of said belting for fastening the belting to a support, the other end of said belting being releasably latchable to another element in a manner to retain a person in a seat, a longitudinal section of said belting between the ends thereof being retractable upon itself to reduce the length of said section and thereby retract said other end of the belting toward the support when said other end is released, said section when retracted being disposed entirely on one side of said fastener member whereby said seat belting can retract toward the support without winding about said fastener member.]

[2. The invention as defined in claim 1 wherein said longitudinal section comprises an elongated prestressed resin strip which automatically retracts when released to reduce the length of said longitudinal section.]

3. In a seat belt assembly for releasably holding a person in a seat, a length of seat belting having one end thereof connectable to a support and the other end thereof releasably connectable to another element of said assembly, said seat belting having two longitudinal sections abutting end to end, one of said sections being self-rolling and the other being nonself-rolling, the juncture between said sections being spaced from said one end of said belting, said self-rolling sections coiling from said juncture when the other end of the belting is released and coiling said nonself-coiling section therewith as it coils away from said juncture whereby the other end of the belting automatically retracts toward said one end when released.

4. The invention as defined in claim 3 wherein said self-rolling section comprises an elongated prestressed resin layer which automatically coils when the other end of the belting is released.

5. The invention as defined in claim 3 wherein said self-rolling section comprises a length of prestretched resilient material bonded to said self-rolling section throughout the length thereof so that said resilient material is under tension when said belting is extended and automatically coils said self-rolling section when the other end of the belting is released.

6. The invention as defined in claim 3 wherein the sections of said belting on both sides of said self-rolling section are nonself-rolling and wherein said self-rolling section coils from both ends thereof toward the center thereof and coils both nonself-rolling sections therewith when the other end of the belting is released.

7. The invention as defined in claim 6 wherein said self-rolling section comprises an elongated prestressed resin layer.

8. The invention as defined in claim 3 wherein said self-rolling section comprises a prestressed resin material impregnated in said belting in a manner to automatically coil said self-rolling sections when the other end of the belting is released.

9. The invention as defined in claim 3 wherein said self-rolling section comprises a layer of resin material bonded to said belting and a prestressed resin layer bonded to said first-mentioned layer.

*10. In combination, a length of seat belting, a fastener member connected to one end of said belting for fastening the belting to a support, the other end of said belting being releasably latchable to another element in a manner to retain a person in a seat, a longitudinal section of said belting between the ends thereof being retractable upon itself to reduce the length of said section and thereby retract said other end of the belting toward the support when said other end is released, said longitudinal section comprising a resilient material externally secured to said belting, said section when retracted being disposed entirely on one side of said fastener member whereby said seat belting can retract toward the support without winding about said fastener member.*

*11. The invention as defined in claim 10 wherein said resilient material comprises an elongated pre-stressed resin strip.*

*12. The invention as defined in claim 10 wherein said resilient material comprises a length of prestretched resilient material bonded externally to said belting so that said resilient material is under tension when said belting is extended and automatically coils said belting when said belting is released.*

*13. The invention as defined in claim 10 wherein said resilient material is coated upon said belting so that*

*said resilient material is under tension when said belting is extended and automatically coils said belting when said belting is released.*

*14. The invention as defined in claim 10 wherein said resilient material is coated upon said belting so as to impregnate said belting and such that said resilient material is under tension when said belting is extended and automatically coils said belting when said belting is released.*

References Cited

The following references, cited by the Examiner, are of record in the patented file of this patent or the original patent.

UNITED STATES PATENTS

| | | | |
|---|---|---|---|
| Re. 25,493 | 12/1963 | Dickey | 156—495 |
| 2,192,101 | 2/1940 | Peskin | 267—1 |
| 2,609,192 | 9/1952 | Lermont | 267—1 |
| 2,826,523 | 3/1958 | Blaszkowski | 161—46 |
| 2,963,080 | 12/1960 | Zang | 297—388 |
| 3,163,467 | 12/1964 | Deneau | 297—388 |
| 3,243,232 | 3/1966 | Blaszkowski | 297—388 |
| 3,307,873 | 3/1967 | Blaszkowski | 297—388 |
| 3,429,614 | 2/1969 | Huggins | 297—388 |

FOREIGN PATENTS

| | | |
|---|---|---|
| 752,489 | 7/1956 | Great Britain. |

CASMIR A. NUNBERG, Primary Examiner

U.S. Cl. X.R.

161—46; 267—1